UNITED STATES PATENT OFFICE.

MEINHARD HOFFMANN AND ARTHUR WEINBERG, OF MAINKUR, NEAR FRANKFORT-ON-THE-MAIN, GERMANY ASSIGNORS, BY MESNE ASSIGNMENTS, TO WILLIAM J. MATHESON, OF BROOKLYN, NEW YORK.

NAPHTHOL-BLACK COLOR COMPOUND.

SPECIFICATION forming part of Reissued Letters Patent No. 11,598, dated April 27, 1897.

Original No. 345,901, dated July 20, 1896. Application for reissue filed March 24, 1897. Serial No. 629,101.

*To all whom it may concern:*

Be it known that we, MEINHARD HOFFMANN and ARTHUR WEINBERG, residing in Mainkur, near Frankfort-on-the-Main, Germany, have invented a new and useful Naphthol-Black Color Compound, of which the following specification is a full description.

The present invention relates to the manufacture of coloring-matters belonging to the azo group.

We take one of the compounds corresponding to the general formula, $$R(SO_3H)_x-N=N-C_{10}H_6NH_2(\alpha),$$

obtained by the reaction of diazo-sulfonic acids upon alpha-naphthylamin and convert it into the diazo-azo compound with the necessary quantity of nitrous acid. This diazo-azo compound is then allowed to react upon naphthol or naphthol sulfonic acids in an alkaline solution.

Our product hereinafter claimed is a dark-blue azo coloring-matter which we call "naphthol-black" and which may be produced in the following manner: We dissolve thirty-five kilograms of naphthylamin disulfonate of sodium in three hundred liters of water acidulated with thirty kilograms of muriatic acid, 21° Baumé, and diazotize by addition of seven kilograms of nitrite of sodium in aqueous solution at a low temperature. Thereupon eighteen kilograms of chlorhydrate of alpha-naphthylamin dissolved in five hundred liters of water are poured into the above mixture while constantly stirring. When this combination is complete, it is converted into the diazo-azo compound by diazotization in the usual way. The diazo-azo compound thus formed is allowed to act upon a solution of thirty-six kilograms of beta-naphthol-alpha-disulfonate of sodium (salt R) kept alkaline by addition of twenty kilograms ammonia of twenty per cent. The immediately-formed coloring-matter separates completely by addition of common salt. It is then filtered and is delivered to the trade as a black paste or in solid form.

Naphthol-black produces on the fiber in an acidulated bath dark-blue shades. It is very soluble in water, insoluble in spirit, and dissolves in strong sulfuric acid with green color. Reducing agents destroy the color, forming alpha-naphthylene-diamin, besides other products.

We do not claim all the numerous bodies covered by the third paragraph of this specification, since said third paragraph is only given for the better understanding of what follows and since some of such bodies will not fit into the process set forth in the fourth paragraph of this specification; but we limit our claim to the product of the process set forth in said fourth paragraph.

We claim—

As a new product, the herein-described dyestuff or coloring-matter of a black color and capable of dyeing shades of dark blue, as set forth.

In testimony whereof we have signed our names to this specification in the presence of two subscribing witnesses.

MEINHARD HOFFMANN.
ARTHUR WEINBERG.

Witnesses:
JEAN GRUND,
GUST. KATHE.